United States Patent
Evans et al.

(10) Patent No.: US 9,596,229 B1
(45) Date of Patent: *Mar. 14, 2017

(54) SECURE PORT FORWARDING TO ACCESS DATA BETWEEN PUBLIC PROCESSING LOCATIONS AND ON-PREMISE COMPONENTS

(71) Applicant: International Business Machines Corporation, Armonk, NY (US)

(72) Inventors: Paul M. Evans, Portland, OR (US); Paul F. Klein, Newbury Park, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/244,702

(22) Filed: Aug. 23, 2016

Related U.S. Application Data

(63) Continuation of application No. 15/054,998, filed on Feb. 26, 2016, now Pat. No. 9,419,984, which is a
(Continued)

(51) Int. Cl.
*G06F 15/16* (2006.01)
*H04L 29/06* (2006.01)
*H04L 29/08* (2006.01)

(52) U.S. Cl.
CPC ........ *H04L 63/0823* (2013.01); *H04L 63/029* (2013.01); *H04L 63/0428* (2013.01);
(Continued)

(58) Field of Classification Search
CPC . H04L 63/029; H04L 63/0428; H04L 63/126; H04L 67/10
(Continued)

(56) References Cited

U.S. PATENT DOCUMENTS 8,843,998 B2   9/2014  Fu et al.
8,850,200 B1 *  9/2014  Horgan ............... H04L 63/0428
                                                              380/277
(Continued)

OTHER PUBLICATIONS

Evans, Paul M., et al., U.S. Appl. No. 14/871,569 entitled "Secure Port Forwarding to Access Data Between Public Processing Locations and On-Premise Components" filed with the USPTO on Sep. 30, 2015.
(Continued)

*Primary Examiner* — Kyung H Shin
(74) *Attorney, Agent, or Firm* — Cantor Colburn LLP; Richard Wilhelm

(57) ABSTRACT

A method for transmitting data from an on-premise component to an off-premise computer image includes: sending a message from the off-premise computer image to an off-premise server and recording an address of the off-premise computer image; sending a message from the off-premise server to the off-premise computer image with instructions for the off-premise computer image to connect to a specific unsecure port of the off-premise server; identifying a connection to the specific unsecure port of the off-premise server within a selected time interval; verifying the recorded address of the off-premise computer image; sending from the off-premise server a message to an on-premise connector to transmit the requested data using the specific unsecure port of the on-premise component if the off-premise computer image is verified and the connection is identified within the selected time interval; and transmitting the requested data using the specific unsecure port of the on-premise component.

1 Claim, 5 Drawing Sheets

Related U.S. Application Data continuation of application No. 14/871,569, filed on Sep. 30, 2015.

(52) U.S. Cl.
CPC ............ *H04L 63/126* (2013.01); *H04L 67/02* (2013.01); *H04L 67/06* (2013.01); *H04L 67/10* (2013.01)

(58) Field of Classification Search
USPC ...... 709/201, 217; 380/227; 713/168; 726/3, 726/4
See application file for complete search history.

(56) References Cited

U.S. PATENT DOCUMENTS

| | | | |
|---|---|---|---|
| 2012/0331528 A1* | 12/2012 | Fu | H04L 67/10 726/4 |
| 2014/0280365 A1 | 9/2014 | Krugmann et al. | |
| 2015/0326579 A1 | 11/2015 | Chandwani et al. | |

OTHER PUBLICATIONS

Evans, Paul M., et al., U.S. Appl. No. 15/054,998 entitled "Secure Port Forwarding to Access Data Between Public Processing Locations and On-Premise Components" filed with the USPTO on Feb. 26, 2016.

List of IBM Patents or Patent Applications Treated As Related (Appendix P), Filed Nov. 16, 2016, 2 pages.

\* cited by examiner

SECURE PORT FORWARDING TO ACCESS DATA BETWEEN PUBLIC PROCESSING LOCATIONS AND ON-PREMISE COMPONENTS

CROSS-REFERENCE TO RELATED APPLICATIONS

The present application is a continuation application of U.S. application Ser. No. 15/054,998 filed Feb. 26, 2016, which is a continuation application of U.S. application Ser. No. 14/871,569 filed on Sep. 30, 2015. The contents of both of which are incorporated by reference herein in their entirety.

BACKGROUND

The present invention relates to transferring information or data securely from an on-premise component to a computing image in a public cloud, and more specifically, to transferring the information using an unencrypted port.

As customers migrate application processing to the cloud they have a need to access data from components that reside on-premise. Partly because it is safer to keep data on-premise but also because for many geographies there may be legislation forbidding corporate data from residing in a cloud that is not hosted in the same geographic location.

Customers thus need a simple way to allow their applications to harvest their on-premise data from the public cloud. Most gateway technologies require the customer to use proprietary interfaces which can require expensive changes to the cloud application code and locks the customer into this one gateway technology. Hence, customers would appreciate a gateway technology that securely bridges the public cloud and the on-premise components for harvesting, computing and returning analyzed data for storage back to the on-premise systems and that is inexpensive to implement.

SUMMARY

According to embodiments of the present invention, a method, system and computer program product are provided for transmitting data from an on-premise component to an off-premise computer image. A first message is sent from the off-premise computer image to an off-premise server using a secure port of the off-premise server. The first message includes a request to receive the data from the on-premise component using a specific unsecure port of the on-premise component. An address of the off-premise computer image sending the first message is recorded. A second message is sent from the off-premise server to the off-premise computer image. The second message includes instructions for the off-premise computer image to connect to a specific unsecure port of the off-premise server. A connection to the specific unsecure port of the off-premise server is identified within a selected time interval. An address of a computer image making the connection to the specific unsecure port is verified as being the same as the recorded address of the off-premise computer image. A third message is sent from the off-premise server, using a secure connection, to an on-premise connector to transmit the requested data using the specific unsecure port of the on-premise component if the off-premise computer image is verified and the connection is identified within the selected time interval. A fourth message is sent from the on-premise connector to the on-premise component instructing the on-premise component to transmit the requested data using the specific unsecure port of the on-premise component. The requested data is transmitted from the on-premise component to the on-premise connector using the specific unsecure port of the on-premise component and then transmitted from the on-premise connector to the off-premise server using the secure connection. The requested data is further transmitted from the off-premise server to the off-premise computer image using the specific unsecure port of the on-premise component.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
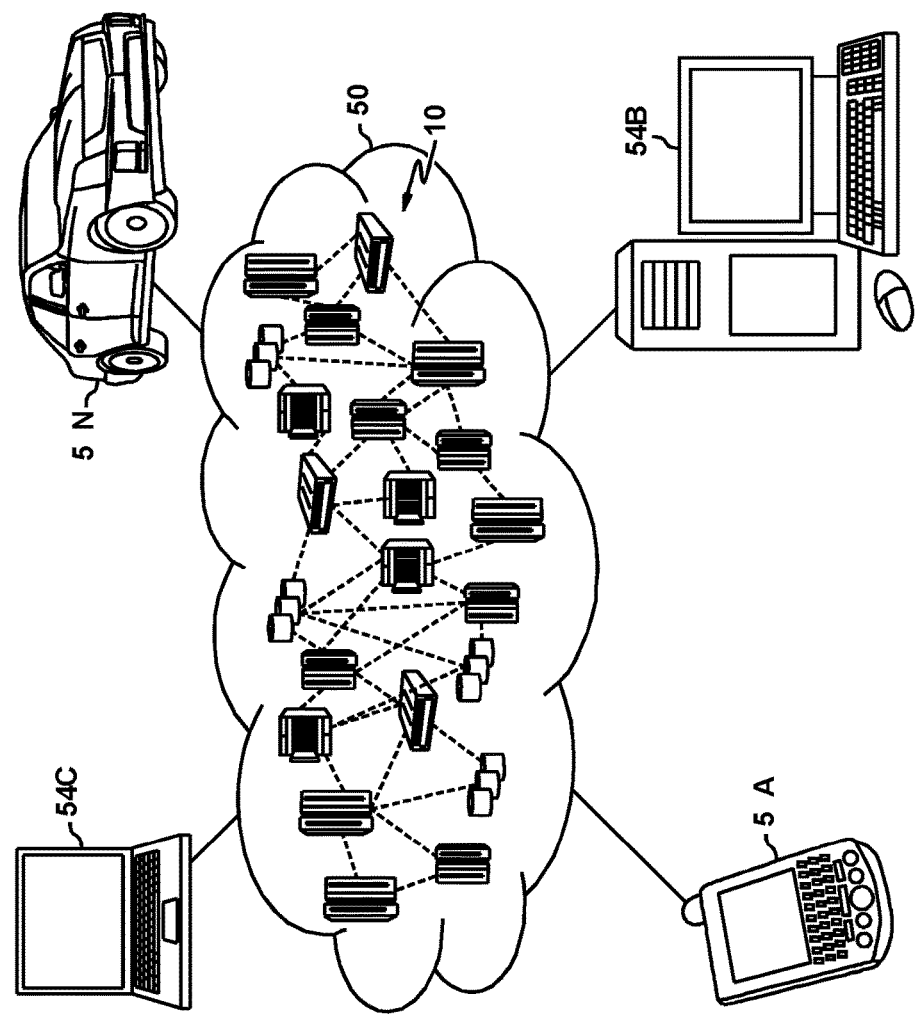
FIG. 1 depicts a cloud computing environment according to an embodiment.

Embodiments described herein are directed to the use of port forwarding due to its support of industry protocols and, thus, not requiring expensive changes to cloud application code. The nature of conventional port forwarding however assumes that the application doing the forwarding is in an environment where it is the only application. This is because conventional port forwarding alone is not a secure method of communication when other applications are running nearby and can be hijacked by viruses without much effort. As disclosed herein, port forwarding with disclosed enhancements implemented by a hybrid gateway allows for secure information transfer between public clouds (i.e., remote off-premise locations where many applications from many Enterprises are running) and an on-premise component. Advantages of the hybrid gateway include allowing existing protocols between the applications in the cloud and the data components on-premise to flow across the hybrid gateway between the public cloud and the on-premise components in an almost seamless and secure manor.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
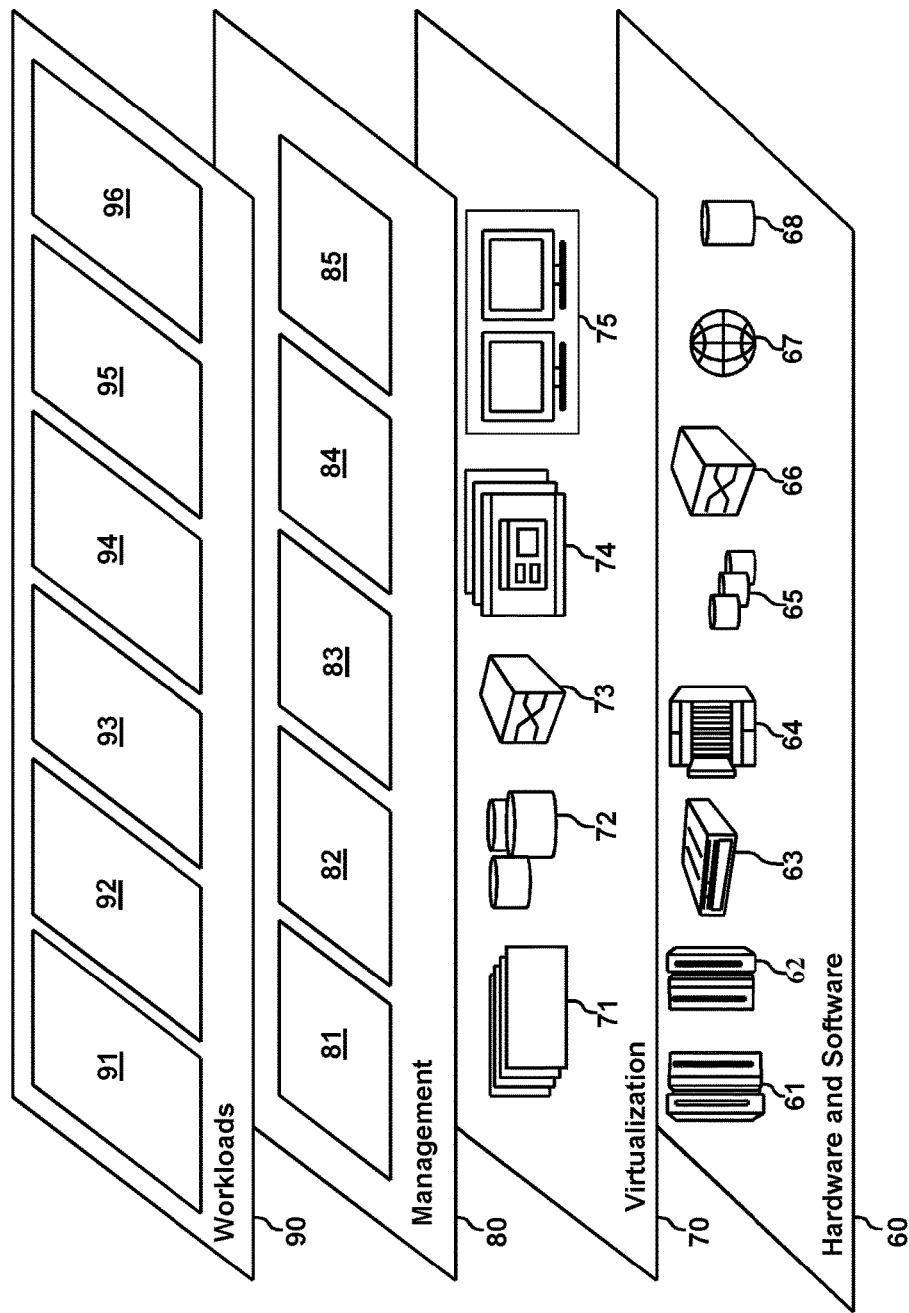
FIG. 2 depicts abstraction model layers according to an embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a secure port forwarding service 96 for transferring information or data securely while using existing protocols such as standard industry protocols.

Figure 3:
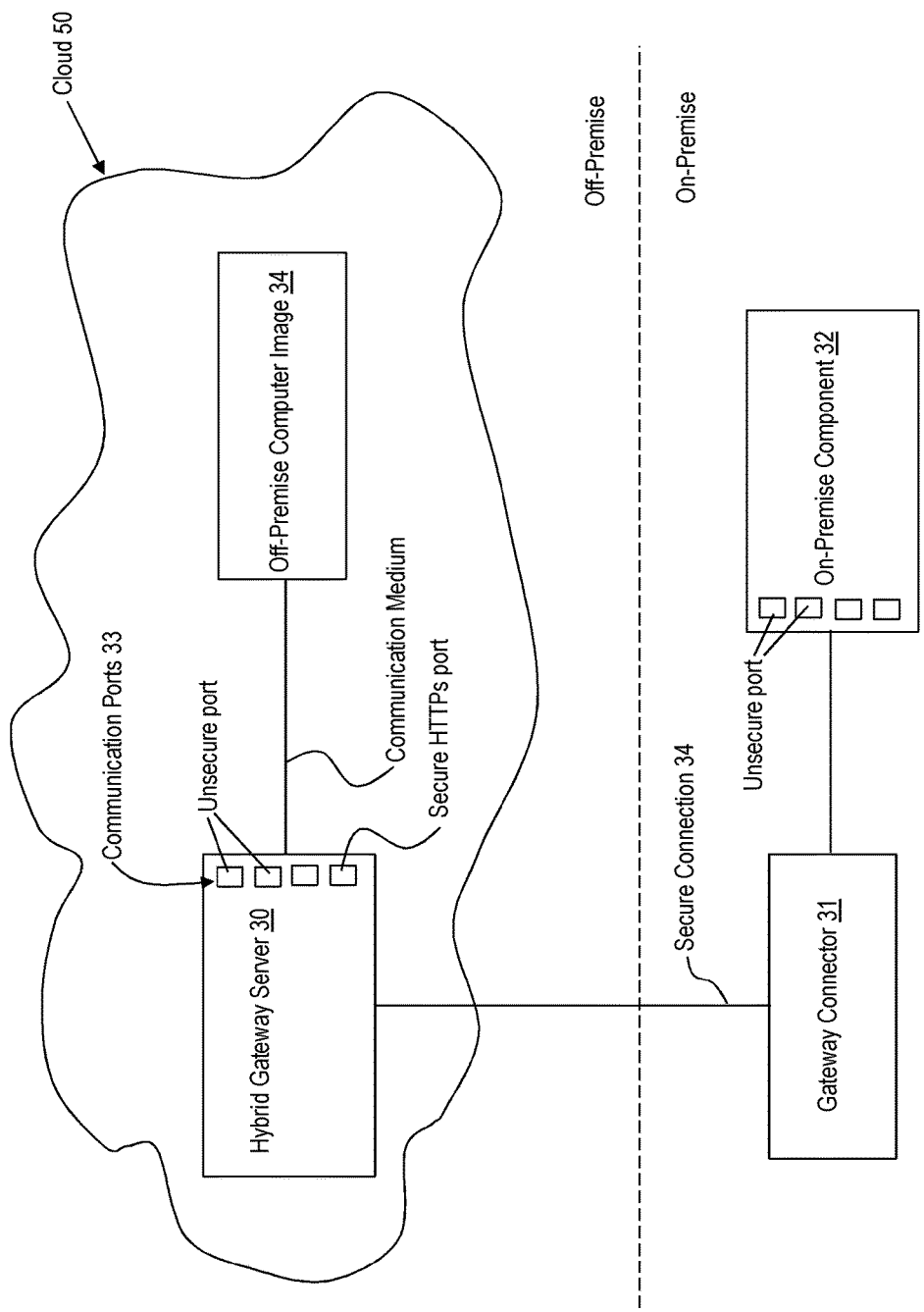
FIG. 3 depicts a schematic diagram of a hybrid gateway and gateway connector according to an embodiment.

Referring now to FIG. 3, a schematic diagram of an example of the secure port forwarding service 96 is shown. The embodiment of FIG. 3 is only one example of a suitable secure port forwarding service 96 and is not intended to suggest any limitation as to the scope of use or functionality of embodiments of the invention described herein. Regardless, the secure port forwarding service 96 is capable of being implemented and/or performing any of the functionality set forth hereinabove.

In the secure port forwarding service 96 in the cloud 50 is a hybrid gateway server 30. The hybrid gateway server 30 is configured to securely communicate with a gateway connector 31 (i.e., software) in order to receive data from an on-premise component 32 and forward that data to an off-premise computer image 34 in the cloud 50. The hybrid gateway server 30 controls a set of gateway ports 33, dynamically assigned to a cloud application, providing a way of controlling a selected gateway port such that no additional cloud application can make use of it. The gateway ports 33 include a plurality of unsecured (i.e., unencrypted) ports and one or more secure (i.e., encrypted) ports. This not only allows a cloud application to use their standard protocols under port forwarding but enforces that rogue cloud applications or viruses cannot hijack the port being used and breach security.

To start, one establishes a hybrid gateway connection. This is not a virtual private network (VPN) Gateway but one that uses HTTPs (Hypertext Transfer Protocol secure) as a tunnel or secure connection 34 between the on-premise component and the cloud. To accomplish this, software is downloaded from the hybrid gateway server or other source and installed to the on-premise component. This software initiates a connection from the on-premise component to the public cloud by tunneling over HTTPs to the hybrid gateway server in the cloud. Since this is HTTPs, certificates will be used to validate that the on-premise Customer has authorization. The hybrid gateway tunnel will also contain a unique encryption KEY that is presented to the hybrid gateway Server in the public cloud during connection. That KEY was part of the component download from the hybrid gateway server or other source and represents who the Customer is. For example, in one or more embodiments that KEY is the Customer identification number concatenated with the Customer's name. This KEY cannot be altered and is imbedded, encrypted, as part of the HTTPs certificate.

Once the hybrid gateway has established connection, it is ready to receive requests from the public cloud. Focusing attention to the public cloud, an application will be running that will want data from a component for computation using a component that resides on-premise. A secure connection to the on-premise component is established using secure port forwarding as discussed in the following paragraphs.

The cloud application will make an application programming interface (API) call to the hybrid gateway server's well known secure Administration Port. As part of this API call, the cloud application will pass a KEY that will be the same KEY as the on-premise component it wishes to communicate with. Again, the KEY is designed so that no two on-premise Customer's will have the same value. The API call will indicate that the application would like to Port Forward a request to a specific transmission control protocol/internet protocol (TCP/IP) address on-premise. At this point, the gateway server will allocate an unsecure gateway port for this purpose and return, via the Administration API, that unsecure gateway port back to the cloud application. The unsecure gateway port allows for the transfer of information using the standard industry protocols. The hybrid gateway server will then open that unsecure gateway port and listen for the cloud application to connect for a selected time interval such as three seconds. For the selected time interval, this unsecure gateway port will be open and if the cloud application does not bind to it—then the gateway server closes this port as a security precaution. When an application port forwards, the port forwarding stream does not contain a KEY to identify which on-premise component it is destined too. That is because port forwarding just contains the native protocol it takes to communicate with the other side under the assumption that it is not in a public cloud and will not have to worry about security. The way this invention secures port forwarding is as follows. When the cloud application makes a request to the gateway server's Administration API it does so with its KEY so the gateway knows what on-premise the port forwarding is targeted to. When the gateway server opens up the port forwarding port it waits 3 seconds for the cloud application to bind. The assumption here is that any rogue cloud application or virus will not statistically have time to randomly bind to this port before the actual cloud application does. Only the same TCP/IP address of the Administration API caller will be accepted for a bind to occur. Any other address will be rejected. A wait time of only three (3) seconds is used in one embodiment so there is not enough time for any fake application or non-authorized application, pretending it is the one that called the Administrator API, to play havoc. As part of the Administration API call, the calling cloud application will also provide the TCP/IP address of the on-premise component it wishes to communicate with. The gateway server will then send a request to the on-premise gateway connector (the downloaded component) and instruct it to open an on-premise port to be used to communicate with the on-premise component. The gateway connector will also be instructed by the gateway server to only allow the communication to be directed to the specific on-premise component that was given in the Administrator API—thus enforcing even more security. Using this technique, a fully secure port forwarding connection can exist between a cloud application and an on-premise data component.

Figure 4A:
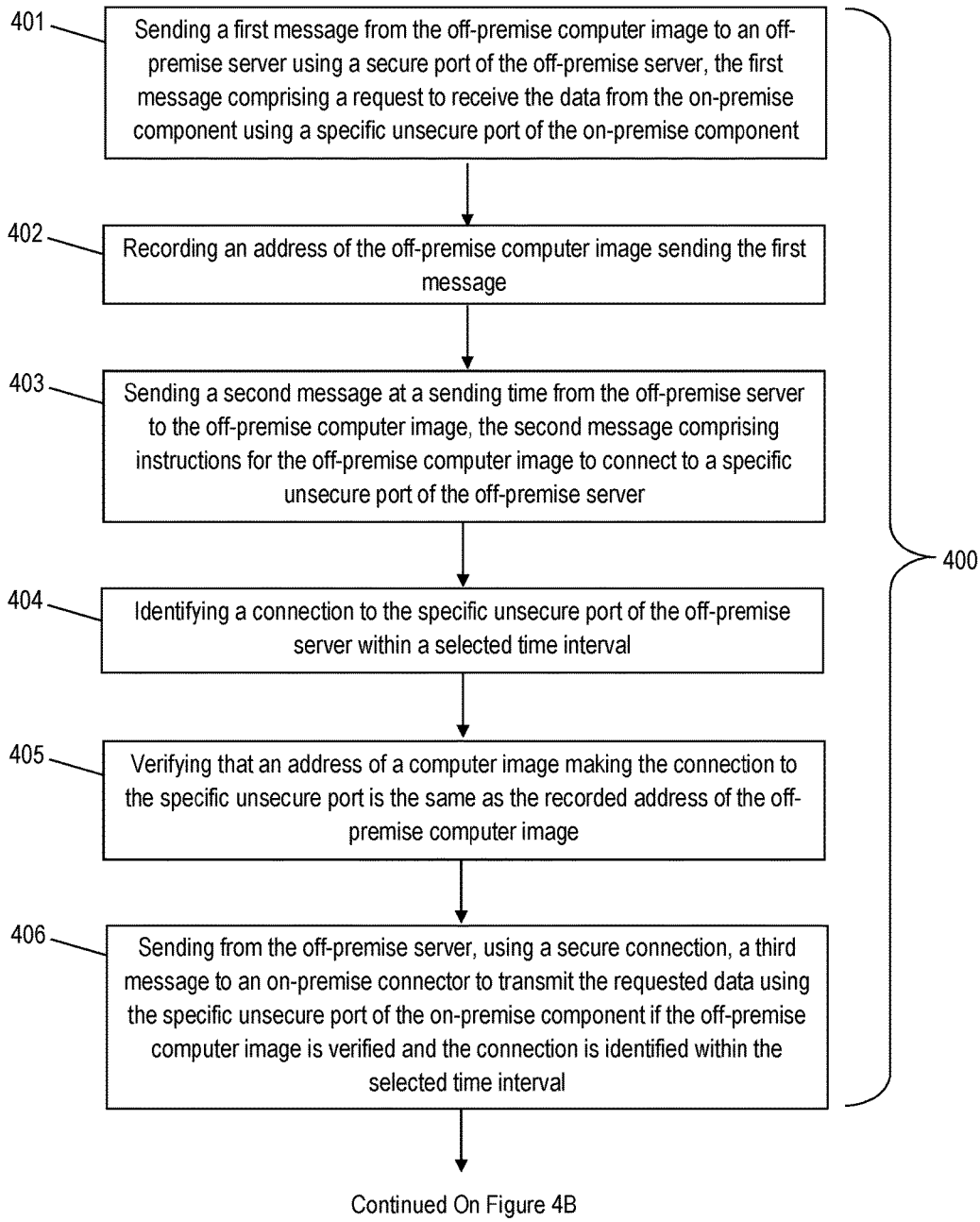
FIGS. 4A and 4B, collectively referred to as FIG. 4, present a flow chart for one example of a method for transferring information to a public cloud computing environment from an on-premise component not in the public cloud computing environment.
Figure 4B:
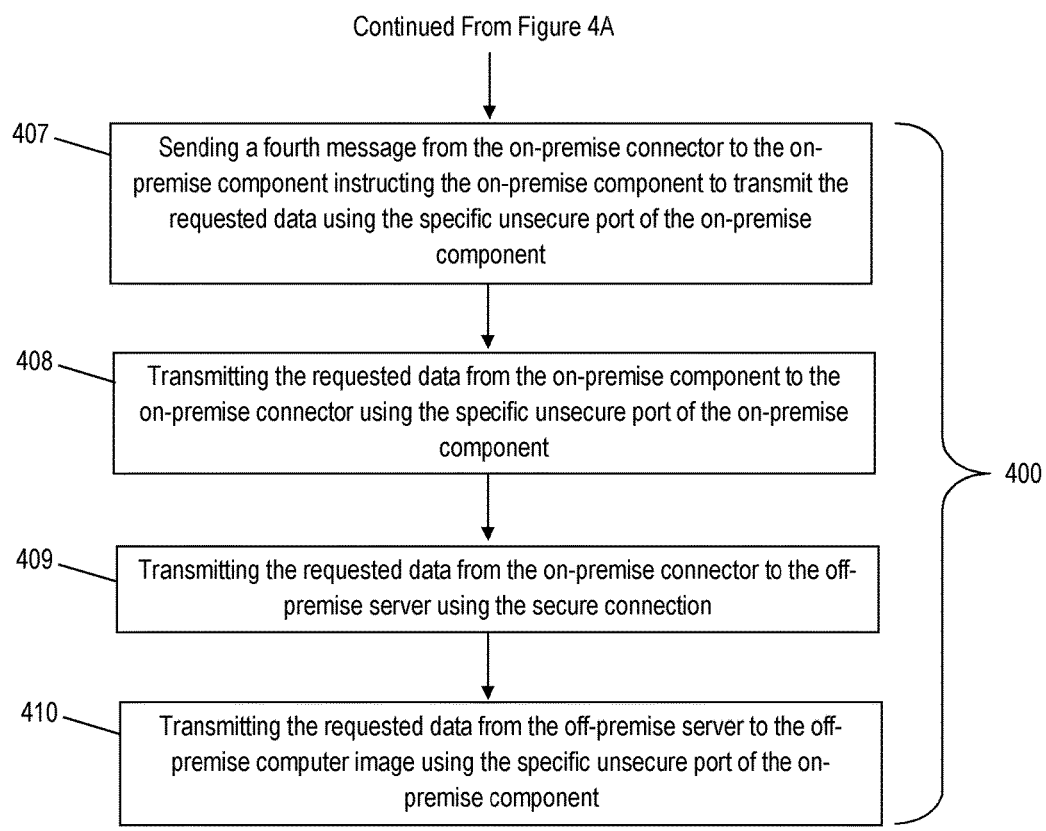

FIG. 4 is a flow chart for one example of a method 400 for transmitting data from an on-premise component to an off-premise computer image such as in a cloud-computing environment. Block 401 calls for sending a first message from the off-premise computer image to an off-premise server using a secure port of the off-premise server, the first message comprising a request to receive the data from the on-premise component using a specific unsecure port of the on-premise component. In one or more embodiments, the secure port of the off-premise server communicates using Hypertext Transfer Protocol with an encrypted connection using an authentication certificate (https). The authentication certificate may include a key that identifies a user. The off-premise computer image and the off-premise server are located in a cloud-computing environment such as the cloud-computing environment 50. The off-premise computer image relates to executing operating system software using a computer or a virtual computer. Multiple virtual computers or virtual computer images may be implemented by a mainframe type of computer. The operating system software may be commercially or publically available operating system.

Block 402 calls for recording an address of the off-premise computer image sending the message. Block 403 calls for sending a second message at a sending time from the off-premise server to the off-premise computer image, the second message having instructions for the off-premise computer image to connect to a specific unsecure port of the off-premise server.

Block 404 calls for identifying a connection to the specific unsecure port of the off-premise server within a selected time interval. In one or more embodiments, the selected time interval is three seconds. Based on experience, this time interval maintains a balance between ensuring that access for non-authorized applications is blocked while at the same time ensuring the off-premise computer image has adequate time to connect to the specific unsecure port. Other selected time intervals may be used based on specific circumstances. The selected time interval may be determined with respect to the sending time of the second message. Block 405 calls for verifying that an address of a computer image making the connection to the specific unsecure port is the same as the recorded address of the off-premise computer image. Block 406 calls for sending from the off-premise server, using a secure connection, a third message to an on-premise connector to transmit the requested data using the specific unsecure port of the on-premise component if the off-premise computer image is verified and the connection is identified within the selected time interval. Similar to or the same as the secure port of the off-premise server, the secure connection may also communicate using https and the same key identifying the user.

Block 407 calls for sending a fourth message from the on-premise connector to the on-premise component instructing the on-premise component to transmit the requested data using the specific unsecure port of the on-premise component.

Block 408 calls for transmitting the requested data from the on-premise component to the on-premise connector using the specific unsecure port of the on-premise component. The key identifying the user is not used for communication in this block and, thus, standard industry protocols may be used for communicating the data. This block may include port forwarding from the specific unsecure port of the on-premise component to the secure connection of the on-premise connector. Block 409 calls for transmitting the requested data from the on-premise connector to the off-premise server using the secure connection. Block 410 calls for transmitting the requested data from the off-premise server to the off-premise computer image using the specific unsecure port of the off-premise server.

The method 400 may also include downloading software implementing the connector to an on-premise server from an off-premise computer system such as the off-premise server for example.

The method 400 may also include closing the connection to the specific unsecure port of the off-premise server if at least one of (a) the address of a computer image making the connection to the specific unsecure port is not the same as the recorded address of the off-premise computer image and (b) the connection is not identified within the selected time interval.

Technical effects and benefits include securely communicating data from an on-premise component (not in a cloud-computing environment) to an off-premise computer image in a cloud-computing environment using an unsecure port of the on-premise component. By using the unsecure port of the on-premise component, standard industry protocols may be used to efficiently transmit the data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "configured" relates to one or more structural limitations of a device that are required for the device to perform the function or operation for which the device is configured. The terms "first," "second" and the like do not denote a particular order but are used to distinguish different elements.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system comprising:
an on-premise component having an unsecured port;
an off-premises computer image having an address;
an off-premise server, having a secure port and an unsecured port; and
an on-premise connector;
wherein the off-premise server and the on-premise connector are operable to implement a method comprising:
sending a first message from the off-premise computer image to the off-premise server using the secure port of the off-premise server, the first message comprising a request to receive the data from the on-premise component using the unsecure port of the on-premise component;
recording the address of the off-premise computer image sending the first message;
sending a second message at a sending time from the off-premise server to the off-premise computer image, the second message comprising instructions for the off-premise computer image to connect to the unsecure port of the off-premise server;
identifying a connection to the unsecure port of the off-premise server within a selected time interval, the time interval determined with respect to the sending time;
verifying that an address of a computer image making the connection to the unsecure port is the same as the recorded address of the off-premise computer image;
downloading software implementing an on-premise connector to the on-premise component from an off-premise computer system;
sending from the off-premise server, using a secure connection, a third message to the on-premise connector to transmit the requested data using the unsecure port of the on-premise component when the off-premise computer image is verified and the connection is identified within the selected time interval, wherein (a) the secure port of the off-premise server and (b) the secure connection between the off-premise server and the on-premise connector implement communication using Hypertext Transfer Protocol with an encrypted connection using an authentication certificate (https) that comprises a key identifying a user;
sending a fourth message from the on-premise connector to the on-premise component instructing the on-premise component to transmit the requested data using the unsecure port of the on-premise component;
transmitting the requested data from the on-premise component to the on-premise connector using the unsecure port of the on-premise component with an standard industry protocol that does not include the key;
transmitting the requested data from the on-premise connector to the off-premise server using the secure connection;
transmitting the requested data from the off-premise server to the off-premise computer image using the unsecure port of the off-premise server;
closing the connection to the unsecure port of the off-premise server when at least one of (a) the address of a computer image making the connection to the unsecure port is not the same as the recorded address of the off-premise computer image and (b) a connection is not identified within the selected time interval.

* * * * *